Dec. 22, 1942. H. KIENZLE 2,305,876
RECORDING APPARATUS FOR VEHICLES
Filed Oct. 8, 1938
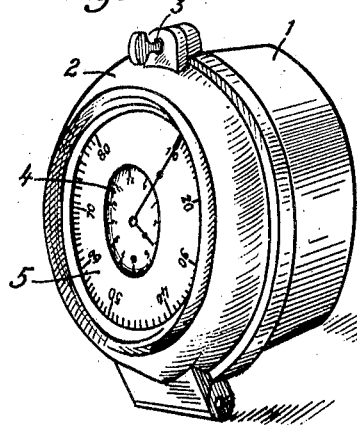
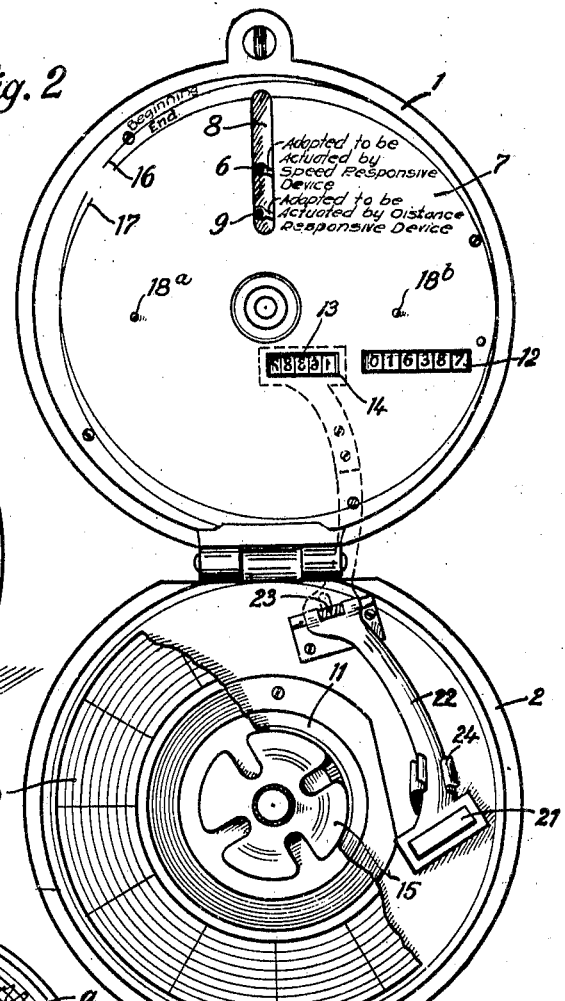
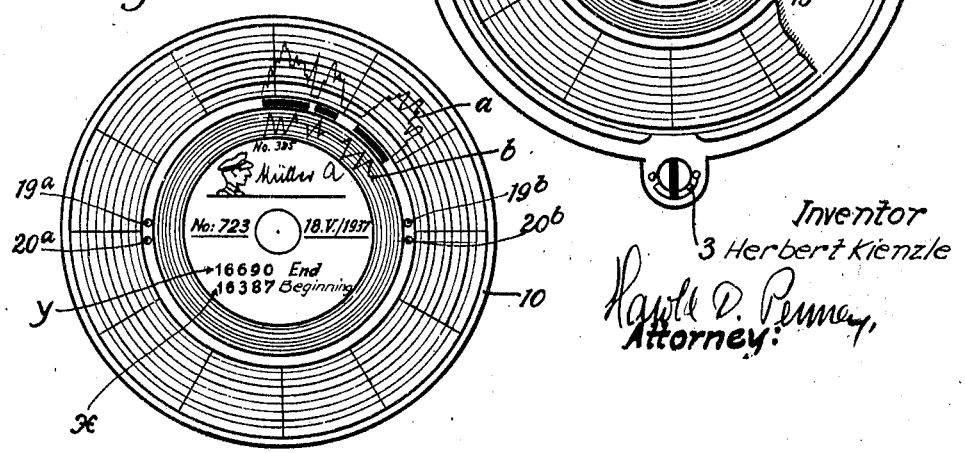
Inventor
Herbert Kienzle
Harold D. Penney
Attorney Patented Dec. 22, 1942

2,305,876

UNITED STATES PATENT OFFICE 2,305,876

RECORDING APPARATUS FOR VEHICLES

Herbert Kienzle, Villingen, Schwarzwald, Germany; vested in the Alien Property Custodian Application October 8, 1938, Serial No. 234,071
In Germany October 11, 1937

4 Claims. (Cl. 234—70)

This invention relates to an indicating and recording apparatus for vehicles, especially power vehicles, of the kind in which, for example, records of the speed of the vehicle at any time and of the distances covered in each unit of time are made on a chart which is moved by a clockwork mechanism. It is known to provide instruments of this kind with a printing mechanism by means of which the state of the mileage indicator can be printed on the chart at the beginning and at the end of the journey. In the known instruments of this kind the printing mechanism was rather complicated and therefore increased the cost of manufacture of the apparatus and further necessitated the use of printing ink which increases the difficulty of attending to the apparatus and has the further disadvantage that the hands of the operator are liable to be soiled when the apparatus is attended to.

According to the present invention, these difficulties are obviated by providing the mileage indicator of the apparatus with printing wheels having raised type which are in the form of mirror images of the numerals which they represent and of which the numerals representing the mileage at any time project through a slot in a wall of the apparatus, so that the mileage can be printed on the chart which is made of paper or the like, which is sensitive to pressure, by pressing the chart against these types.

In this way the mileage can be printed on the chart at the beginning and at the end of the journey without any complicated printing mechanism being necessary and without having to put up with the disadvantages associated with the use of printing ink. When the chart is pressed only lightly against the types of the printing wheels, the numerals are directly impressed on the sensitive paper of the chart, which may consist of a strip or disc of paper of which the front surface on which the impressions are made is covered, for example, with a thin layer of wax.

Further features of the new instrument will be clear from the following description of one form of an instrument in accordance with the invention which is illustrated by way of example in the accompanying drawing, in which:

Figure 1 is a perspective view of the instrument provided with the new printing device in closed condition.

Figure 2 shows an instrument on a larger scale when open, and

Figure 3 shows the chart which is used in the instrument.

Referring to the drawing, in the example illustrated the instrument consists of two casing halves 1 and 2 which are hinged together. When closed, the two halves can be secured in position by a locking device 3. The front casing half 2 is provided with a glass disc behind which is the dial 4 of a clock and the dial 5 of a speedometer. The instrument is adapted to be actuated by known means responsive to the motion of the vehicle. The arbor of the speedometer hand in the cover may be operatively connected to an actuating shaft in the casing in any known manner such as the coupling shown in Figs. 4 and 5 U. S. Patent No. 2,244,653.

In the rear casing half 1 is fitted an actuating mechanism, which is not illustrated in detail, for a stylus 6 which projects through a slot 8 provided in an intermediate partition 7 in the casing and is moved backwards and forwards in this slot in accordance with the speed of the vehicle at the time.

A second stylus 9 which is also movable in the slot 8 is moved, for example, in accordance with the distance travelled by the vehicle.

When the instrument is closed the two styli 6 and 9 which may consist, for example, of sapphire points, coact with the front side of a chart 10 which can be seen in Figure 3 and is provided on this side with a coating of wax or the like which covers the coloured background of the chart. If the chart 10 is now rotated in the proper time by a clockwork mechanism 11 fitted in the casing half 2, the movements of the styli 6 and 9 which correspond respectively to the variations in the speed of the vehicle and to the distances travelled are indicated on the chart by scratchings on the coating of wax. The curves produced in this manner are shown in Figure 3 and indicated by the letters $a$ and $b$ respectively. At the end of the journey one can determine from the curves on the chart the speed with which the vehicle provided with the instrument was travelling at any particular moment and the distance travelled.

The stylus 6 by which the curve $a$ is produced is actuated by the above-mentioned speedometer.

The curve $b$ is produced by the stylus 9 being reciprocated in an approximately radial direction by any well known mechanism responsive to distance travelled by the vehicle. The relative motion between the radial deflections of the stylus and the peripheral feed of the chart results in the production of the curve $b$. The apparatus may be so designed that the upward and downward movement of the stylus corresponds to a definite distance travelled. Thus, for example, each upward and downward movement of the stylus 9 may correspond to 10 kilometres or miles travelled by the vehicle. At high speeds the upward and downward strokes of the curve are close together while they are further apart when the speed is lower, owing to the constant angular velocity of the chart. When the vehicle is stationary a circle is drawn around the centre of the chart by the stylus 9.

For a continuous service record of the vehicle it is necessary in addition to record the mileage at the beginning and at the end of a journey and these mileages must be recorded in exact agreement with the indications given by the mileage indicator provided in the instrument. The mileage indicator itself, in the constructional example illustrated, is fitted in the part 1 of the casing. In Figure 2 are shown the numeral wheels 12 which give a readable indication as well as the printing wheels 13 which are stepped synchronously with the numeral wheels 12 and are provided with raised types in mirror writing. The numerals of these printing wheels which correspond to the distance travelled at any time project through an aperture 14 in the intermediate partition 7 in the casing.

If now after opening the instrument at the beginning or at the end of the journey the chart 10 which is secured in position in the casing half 2 by a clamping member 15 is released, a part of the chart intended for the reception of the impression of the printing wheels 13 can be placed in contact with these wheels. If then a finger or finger nail is drawn over the back of the chart at the place where these printing wheels are situated, the raised type of the printing wheel 13 in the slot 14 make an impression on the sensitive wax layer of the chart. In this way, as shown in Figure 3, the mileages $x$ and $y$ at the beginning and end of the journey respectively can be impressed on the chart without any difficulty.

Since these impressions should be situated as accurately as possible one below the other on the chart in order to calculate from them the distance travelled, separate auxiliary means may be provided to ensure that the chart is placed in the correct position relatively to the printing wheels 13. As shown in Figure 2, there may be indicated for this purpose on the intermediate partition 7, two lines 16 and 17 which correspond to the periphery of the chart and which indicate the correct positions of the chart relatively to the printing wheels 13 when impressions are taken at the beginning and end respectively of a journey. Preferably these indicating lines are marked "Beginning" and "End" corresponding to the positions of the chart.

In addition to or instead of these indicating lines 16 and 17, two pins 18a and 18b can be provided on the intermediate partition 7 over which pairs of holes 19a, 19b and 20a, 20b respectively, which are provided in the chart 10 can be inserted. The holes 19a, 19b and 20a, 20b are arranged at a distance apart which corresponds to the desired spacing of the lines $x$ and $y$ of the mileages printed at the beginning and end of the journey.

With the means described it is possible to ensure in a simple manner that the mileages $x$ and $y$ are printed accurately at the correct place on the chart.

In the form of apparatus which is illustrated by way of example in the drawings, a pad 21 which is made of rubber or the like is used for pressing the chart disc 10 against the printing wheels. The pad 21 is carried by a lever 22 which is pivoted on a hinge 23 provided in the half 2 of the casing and is influenced by a spring which, when the apparatus is opened, tends to move the lever 22 and the pad 21 into the position illustrated by dotted lines in Figure 2. The lever is ordinarily prevented from moving into this position by a catch 24 or the like.

If now when the apparatus is opened the mileage is to be printed on the chart 10, the chart is first brought into its proper position relatively to the printing wheels 13 in the manner previously described. After this the catch 24 is released and the spring acting on the lever 22 causes the pad 21 to snap against the printing wheels 13 or, more accurately, against the part of the chart 10 which is above these wheels.

I claim:

1. Apparatus of the character described comprising first and second members hinged to be closed face to face or opened apart; movable type carried by the second member; positioning means on the inner face of the second member adapted to position a chart in definite relation to the type; and means pivoted to said first member and adapted, when the members are closed to be housed entirely within the apparatus and adapted when the members are opened apart, to be moved to the chart and press, to said type, the positioned chart, without bending said chart.

2. Apparatus of the character described comprising first and second members hinged to be closed face to face or opened apart; movable type carried by the second member; and means pivoted to said first member and adapted, when the members are closed to be housed entirely within the apparatus and adjacent to the second member, and adapted when the members are opened apart, to be moved to press against said type, said pivot means moving the pivot end of said means in a direction away from said second member when the members are opened, and to a position adjacent thereto when the members are closed.

3. Means of the character described comprising first and second members hinged and adapted to be moved to bring their inner faces adjacent or opened apart; movable type carried by the second member; positioning means on the inner face of said second member adapted to position a chart in definite relation to the type; and means pivoted to said first member and adapted, when the members are adjacent to be disposed between the members, and adapted when the members are opened apart, to be moved to the chart and press it to said type.

4. Means of the character described comprising first and second members hinged and adapted to be disposed with inner faces adjacent or opened apart; movable type carried by the second member; and means pivoted to said first member and adapted, when the members are adjacent to be housed between the members and adjacent to the second member, and adapted when the members are opened apart, to be moved to press against said type, said pivot means moving the pivot end of said means in a direction away from said second member when the members are moving to open position, and to a position adjacent thereto when the members are adjacent.

HERBERT KIENZLE.